United States Patent [19]
Ciokajlo et al.

[11] Patent Number: 5,361,580
[45] Date of Patent: Nov. 8, 1994

[54] GAS TURBINE ENGINE ROTOR SUPPORT SYSTEM

[75] Inventors: John J. Ciokajlo, Henderson, Nev.; Ambrose A. Hauser, Wyoming; Samuel H. Davison, Milford, both of Ohio

[73] Assignee: General Electric Company, Cincinnati, Ohio

[21] Appl. No.: 80,666

[22] Filed: Jun. 18, 1993

[51] Int. Cl.⁵ .............................................. F02K 3/02
[52] U.S. Cl. ................................... 60/226.1; 60/268
[58] Field of Search ................. 60/226.1, 39.162, 268; 415/65, 66, 68, 69

[56] References Cited

U.S. PATENT DOCUMENTS

| | | | |
|---|---|---|---|
| 2,505,660 | 4/1950 | Baumann | 60/268 |
| 3,673,802 | 7/1972 | Krebs et al. | 60/226.1 |
| 3,903,690 | 9/1975 | Jones | 415/69 |
| 4,080,785 | 3/1978 | Koff et al. | 415/69 |
| 4,767,271 | 8/1988 | Catlow | 416/129 |
| 4,790,133 | 12/1988 | Stuart | 60/226.1 |
| 4,827,712 | 5/1989 | Coplin | 60/226.1 |
| 4,860,537 | 8/1989 | Taylor | 60/226.1 |
| 4,916,894 | 4/1990 | Adamson et al. | 60/226.1 |
| 4,947,642 | 8/1990 | Grieb et al. | 60/226.1 |
| 4,976,102 | 12/1990 | Taylor | 60/226.1 |
| 5,079,916 | 1/1992 | Johnson | 60/268 |

*Primary Examiner*—Richard A. Bertsch
*Assistant Examiner*—Howard R. Richman
*Attorney, Agent, or Firm*—Jerome C. Squillaro; Nathan D. Herkamp

[57] ABSTRACT

A gas turbine engine rotor support system includes outer and inner rotors having respective outer and inner blades interdigitated in respective blade row stages. A stationary rear frame includes a rear support shaft. A rotatable aft frame is disposed forwardly of the rear frame includes an aft support shaft. And, a rotatable forward frame is disposed forwardly of the aft frame and includes a forward support shaft. The forward and aft frames support the outer and inner rotors, and a first bearing is disposed between the aft shaft and the rear shaft for supporting the aft shaft; a second bearing is disposed between the forward shaft and the aft shaft for supporting the forward shaft; and a third bearing is disposed between a core shaft of a core turbine and the forward shaft for supporting the core shaft thereon.

7 Claims, 2 Drawing Sheets

GAS TURBINE ENGINE ROTOR SUPPORT SYSTEM

The present invention relates generally to aircraft gas turbine engines, and, more specifically, to a rotor support system thereof.

BACKGROUND OF THE INVENTION

Aircraft gas turbine engines include two or more rotors supported by stationary frames thereof. The rotors carry fan, compressor, and turbine blades having radially outer tips disposed closely adjacent to stationary shrouds for maintaining relatively small blade tip clearances therebetween. Small tip clearances are desired for minimizing the leakage of the motive fluids therepast which decreases efficiency of operation of the engine. Accordingly, the several rotors should be supported in bearings as rigidly as possible for minimizing elastic deflections thereof which can undesirably vary the blade tip clearances as is conventionally known.

In one type of gas turbine engine, a counter-rotating power turbine is provided downstream of the core engine for driving forward and aft fan blades either disposed at the forward end of the engine or the aft end of the engine as is conventionally known. Each of the counter-rotating turbine rotors includes a respective plurality of rotor blades extending therefrom in predetermined numbers of axial stages. The blade tip clearances at the bottom of the outer rotor blades and at the top of the inner rotor blades are affected by in-plane bending moments of the two rotors due to the various forces encountered during operation of the engine, with it being desirable to control such blade tip clearances by suitably supporting the rotors to stationary frames. A stationary mid-frame disposed between the core engine and the power turbine, and a stationary rear frame disposed aft of the power turbine are conventionally known and used in various configurations for supporting the power turbine rotors. However, improved support of the power turbine rotors against deflections due to in-plane bending moments is desired for improving the cooperation of the power turbine with the core engine for improving efficiency of operation thereof.

SUMMARY OF THE INVENTION

A gas turbine engine rotor support system includes outer and inner rotors having respective outer and inner blades interdigitated in respective blade row stages. A stationary rear frame includes a rear support shaft. A rotatable aft frame is disposed forwardly of the rear frame and includes an aft support shaft. And, a rotatable forward frame is disposed forwardly of the aft frame and includes a forward support shaft. The forward and aft frames support the outer and inner rotors, and a first bearing is disposed between the aft shaft and the rear shaft for supporting the aft shaft; a second bearing is disposed between the forward shaft and the aft shaft for supporting the forward shaft; and a third bearing is disposed between a core shaft of a core turbine and the forward shaft for supporting the core shaft thereon.

BRIEF DESCRIPTION OF THE DRAWINGS

The invention, in accordance with preferred and exemplary embodiments, together with further objects and advantages thereof, is more particularly described in following detailed description taken in conjunction with the accompanying drawings in which.

DESCRIPTION OF THE PREFERRED EMBODIMENT(S)

Figure 1:
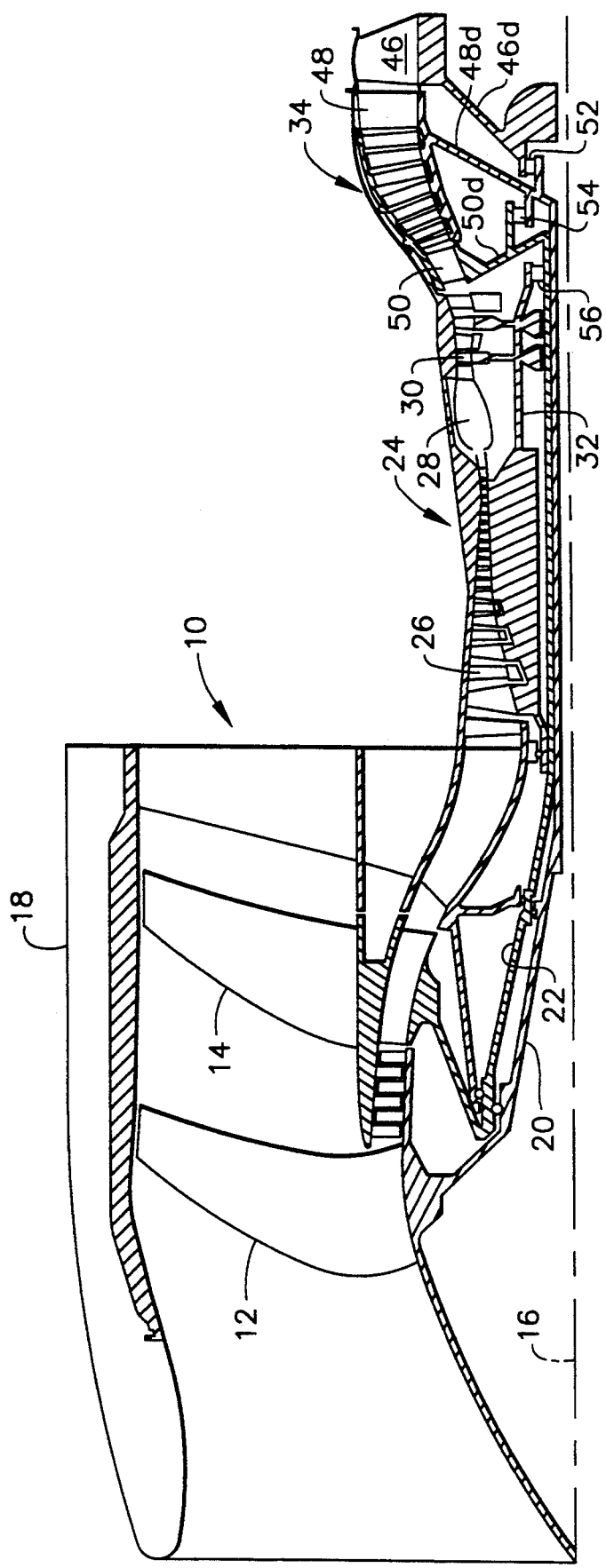
FIG. 1 is a schematic, longitudinal sectional view of the upper half of an aircraft gas turbine engine having counterrotating forward and aft fans powered by a counterrotating turbine with a rotor support system in accordance with one embodiment of the present invention.

Illustrated in FIG. 1 is an exemplary aircraft gas turbine engine 10 having an axially front fan 12 and an aft fan 14 disposed axially downstream therefrom about a longitudinal centerline axis 16. The fans 12, 14 include conventional rows of fan blades disposed within a conventional nacelle 18, with the blades being joined to respective rotor disks receiving power through a front fan shaft 20 joined to the front fan 12 and an aft fan shaft 22 joined to the aft fan 14.

Disposed downstream from the fans is a conventional core engine 24 including a high pressure compressor (HPC) 26, combustor 28, and an exemplary two-stage core or high pressure turbine 30 joined to the HPC 26 by a core rotor or shaft 32. The core engine 24 conventionally generates combustion gases which flow downstream therefrom to a counter-rotating power turbine 34 which extracts energy therefrom for powering the fans 12, 14 through their respective fan shafts 20, 22.

Figure 2:
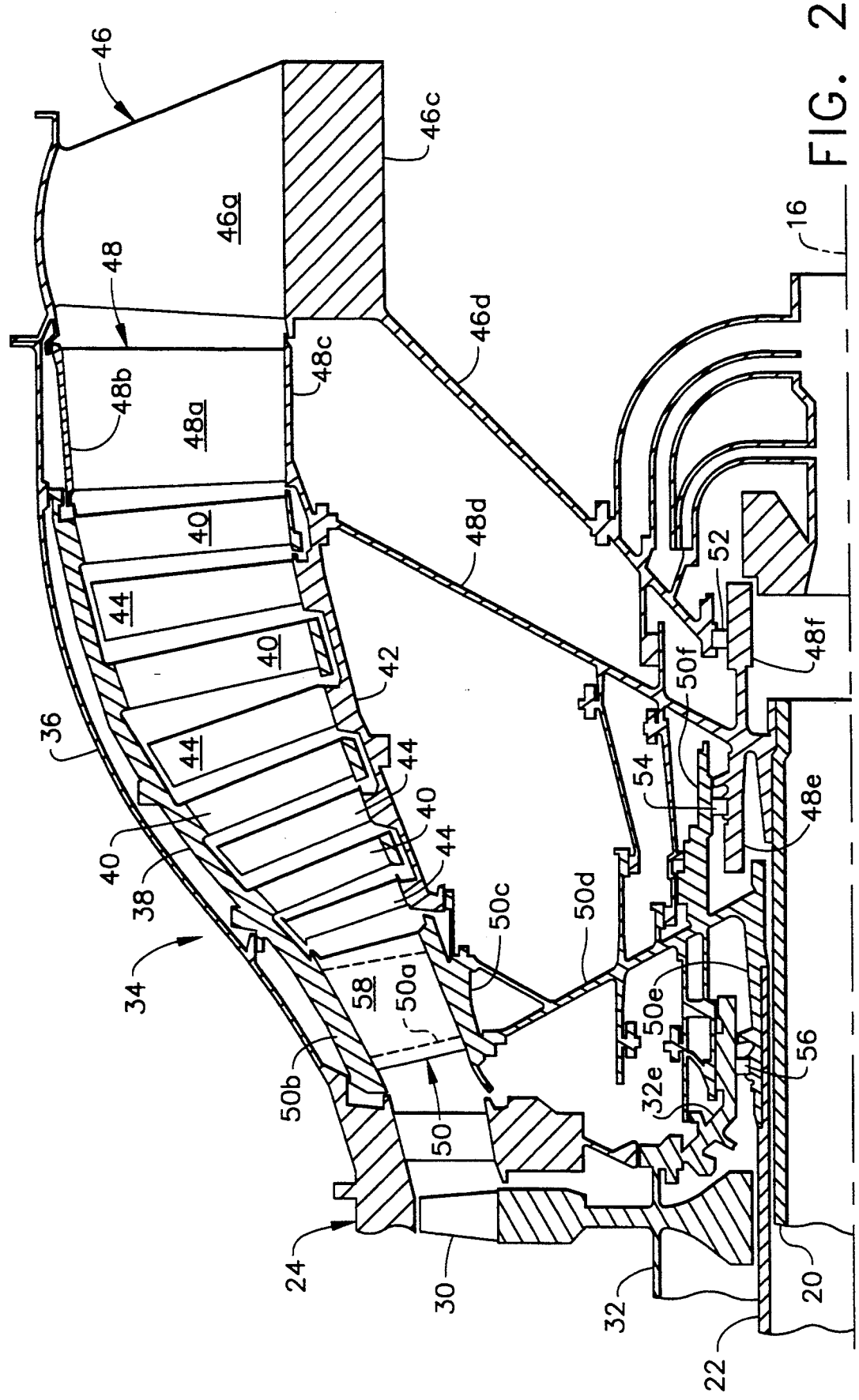
FIG. 2 is an enlarged, schematic view of the counterrotating power turbine illustrated in FIG. 1 and disposed downstream of a high pressure turbine illustrating in more particularity the rotor support system thereof.

The power turbine 34 is illustrated in more particularity in FIG. 2 and includes a stationary outer casing 36 conventionally joined to the core engine 24 at the core turbine 30. The power turbine 34 includes a radially outer rotor 38 in the form of a generally frustoconical drum having a plurality of conventional outer rotor blades 40 extending radially inwardly therefrom in axially spaced apart blade row stages, four being illustrated for example. A radially inner rotor 42 is disposed coaxially with the outer rotor 38 about the centerline axis 16 and includes a plurality of conventional inner rotor blades 44 extending radially outwardly therefrom in axially spaced apart blade row stages, four being shown for example, which are interdigitated with the outer blade stages, with blade stages of the respective outer and inner rotors 38, 42 being disposed axially between respective stages of the other rotor as is conventionally known.

A rotor support system in accordance with one embodiment of the present invention includes a stationary rear frame 46 disposed aft of the outer and inner blades 40, 44 of the power turbine 34. The rear frame 46 includes a plurality of conventional circumferentially spaced apart struts 46a joined at their outer ends to an annular outer band 46b which in turn is conventionally fixedly joined to the outer casing 36, and joined at their inner ends to an annular inner band or hub 46c. The rear frame 46 also includes an annular rear support shaft 46d extending radially inwardly therefrom. In the exemplary embodiment illustrated in FIG. 2, the rear struts 46a are disposed in flow communication with the aft end of the power turbine 34 for receiving the combustion gases therefrom and do not include conventional fairings surrounding the struts since the combustion gases are at a relatively low temperature.

A rotatable aft frame 48 is disposed axially aft of the outer and inner blades 40, 44 and axially forward of the rear frame 46 and is fixedly joined to one of the outer and inner rotors 36, 42 for rotation therewith and for providing additional rigidity for supporting the blades thereof. The aft frame 48 includes a plurality of circumferentially spaced apart struts 48a fixedly joined to radially outer and inner annular aft bands 48b, 48c, with the inner aft band 48c being fixedly joined to an annular aft support shaft 48d for rotation therewith which extends radially inwardly therefrom and axially forward of the rear frame 46. The outer and inner bands 48b, 48c join together the several struts 48a for creating a relatively rigid assembly. In the exemplary embodiment illustrated in FIG. 2, the aft frame 48 at the inner band 48c is fixedly joined to the inner rotor 42.

A rotatable annular forward frame 50 is disposed axially forward of the outer and inner blades 40, 44 and similarly includes a plurality of circumferentially spaced apart forward struts 50a fixedly joined to radially outer and inner annular front bands 50b, 50c, with the inner front band 50c being fixedly joined to an annular forward shah 50d extending radially inwardly therefrom. In the exemplary embodiment illustrated in FIG. 2, the forward frame 50 at the outer band 50b is fixedly joined to the outer rotor 38 for rotation therewith. In the exemplary embodiment illustrated in FIG. 2, each of the forward struts 50a is enclosed by a conventional fairing 58 to protect the struts 50a from the hot combustion gases flowing therebetween. In alternate embodiments where the temperature of the combustion gases is not a problem, the fairings 58 may not be necessary.

Although the outer band 50b of the forward frame 50 is joined to the outer rotor 38, and the inner band 48c of the aft frame 48 is joined to the inner rotor 42 in this exemplary embodiment, in an alternate embodiment the outer band 48b of the aft frame 48 could instead be joined to the outer rotor 38 with the inner band 48c being disconnected from the inner rotor 42, and the inner band 50c of the forward frame 50 would instead be joined to the inner rotor 42 with the outer band 50b being disconnected from the outer rotor 38. In either embodiment, the rear frame 48 is joined to one of the outer and inner rotors 38, 42 for rotation therewith, and the forward frame 50 is joined to the other thereof for rotation therewith. In either embodiment, each of the frames 48, 50 is a relatively rigid structure since the respective struts thereof are joined to the respective outer and inner annular bands. The rigidity of the frames 48, 50 is used in accordance with the present invention to increase the rigidity of the respective rotors 38, 42 for decreasing the amount of blade tip clearance variation due to in-plane bending moments which occur during operation of the power turbine 34. Since the aft frame 48 is joined at its inner band 48c to the inner rotor 42 it increases the rigidity thereof. Similarly, since the forward frame 50 is joined at its outer band 50b to the outer rotor 38, it also increases the rigidity thereof.

Blade tip clearances are further reduced by supporting the outer and inner rotors 38, 42 to the rear frame 46 in accordance with another feature of the present invention. Since the rear frame 46 is supported at its outer band 46b to the outer casing 36, it has a relatively large diameter with a correspondingly large structural rigidity. By supporting the power turbine 34 solely on the rear frame 46 instead of a conventional mid-frame (not shown) having a smaller diameter which is typically located between the core turbine 30 and the power turbine 34, an improved support system is created as well as providing close-coupling between the core turbine 30 and the power turbine 34 for channeling the combustion gases thereto with improved efficiency. The core turbine 30 is disposed axially forwardly of the outer and inner blades 40, 44 and may be positioned relatively close thereto by the elimination of the stationary mid-frame (not shown) typically used for supporting power turbines.

In the exemplary embodiment illustrated in FIG. 2, a conventional first bearing 52 is disposed between the aft shaft 48d and the rear shaft 46d for supporting the aft shaft 48d on the rear shaft 46d. A conventional second bearing 54 is disposed between the forward shaft 50d and the aft shaft 48d for supporting the forward shaft 50d on the aft shaft 48d. And, a conventional third bearing 56 is disposed between the core shaft 32 and the forward shaft 50d for supporting the core shaft 32 on the forward shaft 50d. In the exemplary embodiment illustrated in FIG. 2, the first, second and third bearings 52, 54, 56 are preferably roller bearings, with the second bearing 24 being a differential-type bearing since it is mounted between the two counter-rotating shafts 48d, 50d. Other types of bearings may be used as desired.

Since the outer casing 36 is stationary and surrounds the outer and inner blades 40, 44, and is fixedly joined to the rear frame 46 for its support at its outer diameter, the rear frame 46 provides a substantially rigid support for both power turbine rotors 38 and 42 as well as the aft end of the core shaft 32. To further increase the rigidity of the system, the rear shaft 46d is preferably frustoconical and extends axially forwardly from the rear frame 46 toward the aft shaft 48d. Similarly, the aft shah 48d is preferably frustoconical and extends axially forwardly toward the forward shaft 50d. And, the forward shaft 50d is also frustoconical but extends axially aft toward the aft shaft 48d. In this way, the additional rigidity due to the cone shapes is obtained from each of the shafts 46d, 48d, and 50d.

The shafts 46d, 48d, and 50d include various appendages for forming conventional seals therebetween as is conventionally known. In order to carry structural loads, however, the front shaft 50d in this exemplary embodiment includes a forward cylindrical extension 50e disposed adjacent its radially inner end supporting the inner race of the third bearing 56, and an aft cylindrical extension 50f disposed adjacent and slightly radially above the forward extension 50e and supporting the outer race of the second bearing 54. The core shaft 32 includes a cylindrical extension 32e extending aft toward the forward shaft 50d for supporting the outer race of the third bearing 56. The aft shaft 48d includes a forward cylindrical extension 48e disposed adjacent its radially inner end supporting the inner race of the second bearing 54, and an aft cylindrical extension 48f disposed adjacent and coextensively with the forward extension 48e and supporting the inner race of the first bearing 52. The outer race of the first bearing 52 is supported on the radially inner end of the rear support shaft 48d. The inner surface of the forward extension 50e of the forward frame 50 includes a conventional spline joint with the aft fan shaft 22, and the radially inner end of the aft shaft 48d similarly includes a spline joint with the front fan shaft 20.

Accordingly, shaft power is carried by the respective shafts 20, 22, and 32 to their respective fans and compressor for providing power thereto, with the support system therefor having improved rigidity for reducing undesirable variations in blade tip clearances due to the mounting of the rotors thereof. The core shaft 32 is supported through the extension 32e and the third bearing 56 by the forward shaft 50d of the power turbine 34. The forward shaft 50d is supported in turn through the second bearing 54 by the aft shaft 48d. And, the aft shaft 48d is supported in turn through the first bearing 52 by the rear shaft 46d of the rear frame 46. In this way, the structurally large and rigid stationary rear frame 46 provides an effective support for the power turbine 34 and the aft end of the core turbine 30, with the rotating aft and forward frames 48, 50 providing increased rigidity for the respective inner and outer rotors 42, 38.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is claimed and desired to be secured by Letters Patent of the United States is the invention as defined and differentiated in the following claims:

1. A gas turbine engine rotor support system comprising:
   an outer rotor having a plurality of outer blades extending radially inwardly therefrom in axially spaced apart blade row stages;
   an inner rotor having a plurality of inner blades extending radially outwardly therefrom in axially spaced apart blade row stages and interdigitated with said outer blade row stages;
   a stationary rear frame disposed aft of said outer and inner blades and having an annular rear support shaft extending radially inwardly therefrom;
   a rotatable aft frame disposed axially aft of said outer and inner blades and axially forward of said stationary rear frame and fixedly joined to one of said outer and inner rotors for rotation therewith, said aft frame including an aft support shaft extending radially inwardly therefrom;
   a rotatable forward frame disposed axially forward of said outer and inner blades and fixedly joined to the other of said outer and inner rotors for rotation therewith, said forward frame including a forward support shaft extending radially inwardly therefrom;
   a core turbine disposed axially forward of said outer and inner blades and having a core shaft;
   a first bearing disposed between said aft support shaft and said rear support shaft for supporting said aft support shaft thereon;
   a second bearing disposed between said forward support shaft and said aft support shaft for supporting said forward support shaft thereon; and
   a third bearing disposed between said core shaft and said forward support shaft for supporting said core shaft thereon.

2. A rotor support system according to claim 1 further comprising an outer casing surrounding said outer and inner blades and fixedly joined to said stationary rear frame, and wherein said rear support shaft is frustoconical and extends axially forward from said stationary rear frame toward said aft support shaft.

3. A rotor support system according to claim 2 wherein:
   said notatable forward frame includes a plurality of circumferentially spaced apart front struts joined to radially outer and inner annular front bands, said inner front band being fixedly joined to said forward support shaft; and
   said rotatable aft frame includes a plurality of circumferentially spaced apart aft struts joined to radially outer and inner annular aft bands, said inner aft band being fixedly joined to said aft supportably.

4. A rotor support system according to claim 3 wherein said aft support shaft is frustoconical and extends axially forward, and said forward support shaft is frustoconical and extends axially aft.

5. A rotor support system according to claim 4 wherein:
   said rotatable aft frame is fixedly joined to said inner rotor; and
   said rotatable forward frame is fixedly joined to said outer rotor.

6. A rotor support system according to claim 5 further comprising:
   a front fan having a front fan shaft joined to said aft support shaft; and
   an aft fan disposed axially aft of said front fan and having an aft fan shaft joined to said forward support shaft.

7. A rotor support system according to claim 5 wherein:
   said forward support shaft includes a forward extension disposed adjacent its radially inner end supporting said third bearing, and an aft extension disposed adjacent said forward extension and supporting said second bearing; and
   said aft support shaft includes a forward extension disposed adjacent its radially inner end supporting said second bearing, and an aft extension disposed adjacent said forward extension thereof and supporting said first bearing.

* * * * *